United States Patent
Sudo et al.

(10) Patent No.: US 9,618,033 B2
(45) Date of Patent: Apr. 11, 2017

(54) CONTROL CABLE AND REMOTE CONTROL DEVICE USING THE SAME

(71) Applicant: HI-LEX CORPORATION, Takarazuka-shi, Hyogo (JP)

(72) Inventors: Kazunori Sudo, Takarazuka (JP); Takuro Sakai, Takarazuka (JP)

(73) Assignee: HI-LEX CORPORATION, Takarazuka-shi, Hyogo (JP)

( * ) Notice: Subject to any disclaimer, the term of this patent is extended or adjusted under 35 U.S.C. 154(b) by 0 days.

(21) Appl. No.: 14/733,273

(22) Filed: Jun. 8, 2015

(65) Prior Publication Data
US 2016/0047410 A1 Feb. 18, 2016

Related U.S. Application Data

(62) Division of application No. 12/303,080, filed as application No. PCT/JP2007/060854 on May 29, 2007, now abandoned.

(30) Foreign Application Priority Data

May 29, 2006 (JP) ................................ 2006-148212

(51) Int. Cl.
*F16C 1/18* (2006.01)
*F16C 1/26* (2006.01)
(Continued)

(52) U.S. Cl.
CPC .............. *F16C 1/18* (2013.01); *F16C 1/106* (2013.01); *F16C 1/12* (2013.01); *F16C 1/20* (2013.01); *F16C 1/26* (2013.01); *Y10T 74/20456* (2015.01)

(58) Field of Classification Search
CPC ........................... F16C 1/18; Y10T 74/20456
(Continued)

(56) References Cited

U.S. PATENT DOCUMENTS 1,718,978 A 7/1929 Protzellar
1,935,806 A * 11/1933 Mautsch ................. F16C 1/10
74/487

(Continued)

FOREIGN PATENT DOCUMENTS

EP 0395232 10/1990
FR 2072615 9/1971
(Continued)

OTHER PUBLICATIONS wikipedia.org/wiki/Synthetic_resin, Apr. 24, 2016.*
Define ribbon, google.search.com, Apr. 24, 2016.*

*Primary Examiner* — Vinh Luong
(74) *Attorney, Agent, or Firm* — Browdy and Neimark, PLLC

(57) ABSTRACT

A remote control device is provided, which includes a control cable. The control cable includes a reinforcing wire 11 of which the both ends are fixed by anchors 14, 14, an outer casing 12 made of synthetic resin so as to be slidable to the reinforcing cable, and so as not to constrain the thermal deformation in the axial direction based on the variation of ambient temperature, and an inner cable 13 made of metal having flexibility housed in the outer casing 12 slidably. In the both ends of the inner cable, cable ends 17, 17 coupled to an operating member and an operated member are firmly fixed.

8 Claims, 8 Drawing Sheets

(51) Int. Cl.
*F16C 1/12* (2006.01)
*F16C 1/10* (2006.01)
*F16C 1/20* (2006.01)

(58) Field of Classification Search
USPC .............. 74/743.11, 487; 454/69; 188/196 B
See application file for complete search history.

(56) References Cited

U.S. PATENT DOCUMENTS

| | | | |
|---|---|---|---|
| 2,066,242 | A | 12/1936 | Abbott |
| 2,774,382 | A | 12/1956 | Bentley |
| 3,439,555 | A | 4/1969 | Rech |
| 3,533,303 | A | 10/1970 | Mcintyre |
| 3,618,420 | A | 11/1971 | Horwitt et al. |
| 4,052,911 | A | 10/1977 | Feldstein |
| 4,445,395 | A | 5/1984 | Beckman et al. |
| 4,487,997 | A | 12/1984 | Ditchfield |
| 4,516,441 | A | 5/1985 | Paynter |
| 4,681,169 | A | 7/1987 | Brookbank, III |
| 4,907,465 | A * | 3/1990 | Machida ............... F16H 59/045 74/473.11 |
| 5,301,563 | A * | 4/1994 | Van Zanten .............. F16C 1/18 188/196 B |
| 5,555,769 | A * | 9/1996 | Lichtenberg .............. F16C 1/18 454/69 |
| 6,085,611 | A | 7/2000 | Valdez |
| 6,553,719 | B1 | 4/2003 | Stone et al. |
| 2002/0339942 | | 11/2002 | Komatsu et al. |
| 2003/0080546 | A1* | 5/2003 | Shimizu ................. B62D 1/163 280/771 |
| 2008/0188868 | A1 | 8/2008 | Weitzner et al. |
| 2011/0290065 | A1 | 12/2011 | Ehrenreich et al. |
| 2014/0116190 | A1 | 5/2014 | Sugii |

FOREIGN PATENT DOCUMENTS

| | | |
|---|---|---|
| JP | 1982-116774 | 2/1984 |
| JP | 59-121216 | 7/1984 |
| JP | 1983-135031 | 3/1985 |
| JP | 1985-42911 | 9/1986 |
| JP | 1990-61791 | 2/1992 |
| JP | 1990-63759 | 2/1992 |
| JP | 09-21413 | 1/1997 |
| JP | 2002-339942 | 11/2002 |
| WO | 01-88393 | 11/2002 |

* cited by examiner

FIG. 1
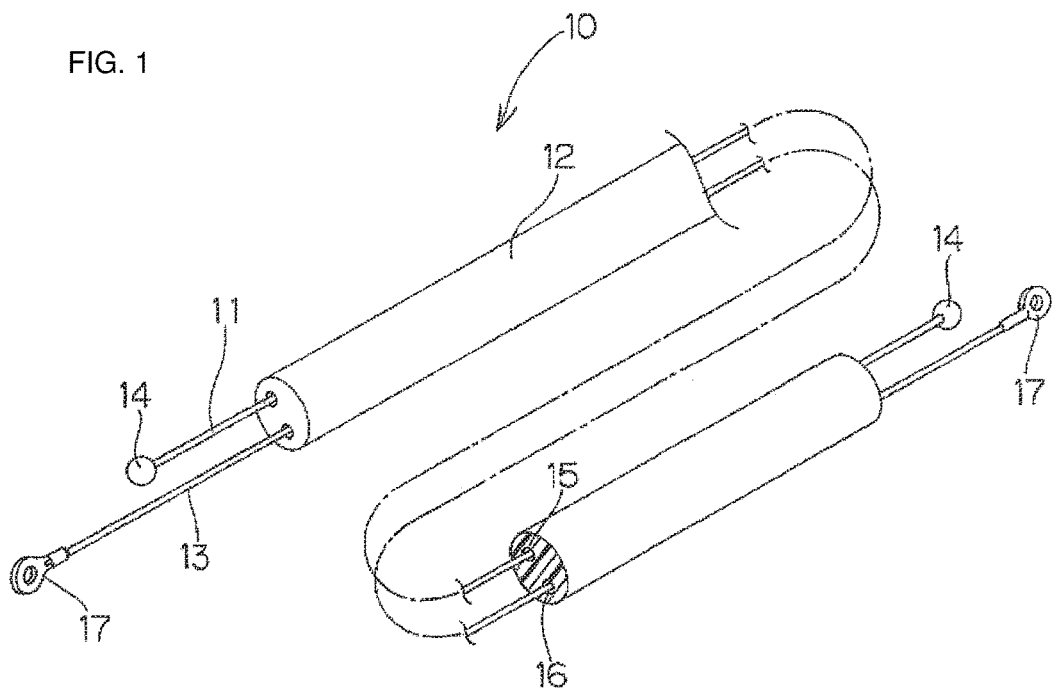
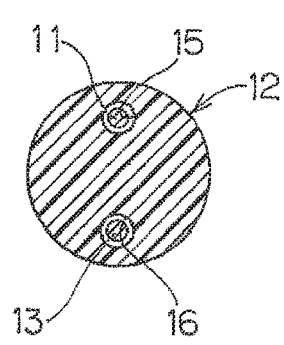
FIG. 2a
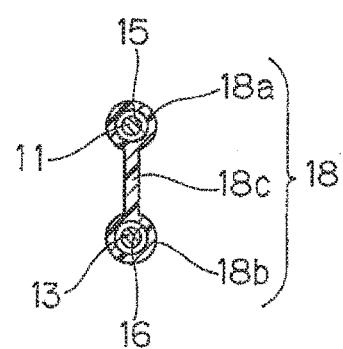
FIG. 2b

CONTROL CABLE AND REMOTE CONTROL DEVICE USING THE SAME

FIELD OF THE INVENTION

The present invention relates to a control cable and a remote control device using the same.

BACKGROUND ARTS

Patent Document 1: Japanese Published Patent Application No. S59-121216

Patent Document 2: Japanese Published Patent Application No. H09-21413

A commonly used control cable 100 consists of an outer casing 101 having flexibility and an inner cable 102 housed slidably in the outer casing 101 as shown in FIG. 11 for example. The inner cable 102 often consists of a twisted wire made by twisting metal element wires. However, in the case of light load, it is sometimes consists of a metal single wire. In the inner cable 102, cable ends (nipple) 103, 103 made of metal for engaging an operating member and an operated member are firmly fixed to the both ends by casting or clamping.

The outer casing 101 includes an armor layer 104 consisting of a spiral tube made by winding spirally a steel wire of rectangular cross section and a covering layer 105 made of synthetic resin covered on the surface of the armor layer 104. There is also a case that a liner made from synthetic resin tube is provided in the inner face of the armor layer 104. Further, an armor layer may be composed around the liner with a shield layer in which a plurality of wire members made of metal or hard synthetic resin is arranged in a loose spiral shape. In the both ends of the outer casing 101, casing caps 106, 106 made of metal or synthetic resin are covered and firmly fixed by clamping etc.

In such control cable 100, the outer casing 101 is arranged along a curved cabling path, and the casing caps 106, 106 of the both ends are engaged with a bracket 107 etc. Further, the cable ends 103, 103 of the both ends of the cable 102 are engaged with an operating member 108 and an operated member 109 etc. and are attached. And, the operating member 109 is operated by push-pull action, which transmits the operating force to the operated member 109 to perform remote control.

Since the commonly used control cable 100 described above is equipped with the armor layer 104 in the outer casing 101, even if a large tensile force is applied to the inner cable 102, it can support the reactive force. Hence, it can transmit a large operating force.

On the other hand, in a light load cable, a simple control cable is used. The cable consists of an outer casing made from synthetic resin pipe and an inner cable housed slidably in the outer casing. In this outer casing also, casing caps, are fixed firmly to the both ends, and the cables are laid along a cabling path by being engaged with brackets etc. respectively. However, since the pipe made of synthetic resin is very high in thermal expansion coefficient compared with metal, if it is laid in an engine room etc. there is a problem that outer casing extends/contracts according to ambient temperature.

For example, when the ambient temperature becomes high, the length of the outer casing becomes long relatively to the inner cable, the sum (A+B) of the length A, B of the portion protruding from the outer casing of the inner cable becomes shorter than that in the time of attachment. Hence, despite that the inner cable is not really operated, it comes into a status being pull-operated, causing the malfunction of the operated member.

In order to solve such a problem, Patent Document 1 offers an outer casing 117 which is, shown in FIG. 12, reinforced by embedding two reinforcing fibers 116, 116 in the both sides of a central hole 115 to pass an inner cable of a pipe 114 made of thermoplastic resin. Additionally, in Patent Document 1, it is described that the reinforcing fibers are preferable to be 2-10 in number (claim 2), and that as the reinforcing fiber, a carbon fiber, a glass fiber, a Keplar fiber (that in which a plurality of fibers are twisted) are preferable (claim 3). Further, it is described that if steel wires are used, the flexibility becomes impaired because the rigidity becomes too large (comparable example 3, the upper left column 12-15 of page 3 of Patent Document 1).

On the other hand, in Patent Document 2, a push-pull control cable which passes two inner cables in one outer casing is disclosed.

DISCLOSURE OF INVENTION

Problems to be Resolved by the Invention

The outer casing 117 of Patent Document 1 is that in which a pipe 114 made of thermoplastic resin and a reinforcing fiber 116 are integrated, and the thermal expansion of the pipe 114 is suppressed by the tensile strength of the reinforcing fiber 116. Hence, if the thermal expansion coefficient of whole of the outer casing 117 is intended to make equal to metal, it is necessary to make the strength of the reinforcing fiber 116 higher than a metal wire, the flexibility does not become so high (the upper left column 5-8 of page 4 of Patent Document 1; being 180 g in the carbon fiber of the embodiment 1, being 200 g in the steel wire of the comparative example).

The present invention is directed to provide a control cable equipped with an outer casing made of synthetic resin, in which malfunction is few even in the use environment of high temperature, furthermore, is sufficiently high in flexibility, and facilitates cabling.

Means of Solving the Problems

The control cable of the present invention includes a reinforcing wire made of metal, of which the both ends are to be fixed; an outer casing made of synthetic resin provided so as to be slidable to the reinforcing cable, and so as not to constrain the thermal deformation in the axial direction based on the variation of ambient temperature; and an inner cable made of metal having flexibility housed in the outer casing slidably. Additionally, the above described phrase "not to constrain" includes any of the case that it does not constrain thermal expansion only, that it does not constrain thermal contraction only, and that it does not constrain the both.

In such control cable, it is preferable that the reinforcing wire is provided as one pair in parallel, and the inner cable is arranged between those reinforcing cables. It may be that in which the inner cable is provided as one pair in parallel, and the reinforcing cable is arranged between those inner cables. Further, it is preferable that the outer casing exhibits a ribbon-like shape. Further, it is preferable that the reinforcing cable is composed of a single wire made of metal, and the inner cable is composed of a plurality of twisted wires of metal element wires. And, in the case of a light load operation, the reinforcing wire and the inner cable may be composed of a single wire made of metal respectively.

The remote control device of the present invention includes an operating member which gives an operating force; a bracket of operation side; and an operated member to receive the operation of the operating member through the control cable, the control cable having a reinforcing wire made of metal, of which the both ends are to be fixed; an outer casing made of synthetic resin provided so as to be slidable to the reinforcing cable, and so as not to constrain the thermal deformation in the axial direction based on the variation of ambient temperature; and an inner cable made of metal having flexibility housed in the outer casing slidably; and a bracket of operated side. The both ends of the reinforcing wire of the control cable are fixed to the brackets of the operating side and the operated side; at least one end of the outer casing of the control cable is held slidably in the axis direction by the bracket of the operating side or the operated side; and the both ends of the inner cable of the control cable are coupled to the operating member and the operated member.

In such remote control device, it is preferable that the operating member and the operated member are pulleys provided turnably within a predetermined angle to the each bracket; the outer casing exhibits the ribbon-like shape; the reinforcing wire is provided slidably along the center of the outer casing, and at the same time, the inner cable is provided as one pair of two wires; and these inner cables are provided slidably along the both side edges the outer casing.

In this case, it is preferable that at least one end side of the ends of the one pair of the inner cable are firmly fixed by one cable end mutually in a lump, and the cable end is engaged with the pulley of the operating side or the pulley of the operated side.

Further, it is preferable that the operating member or the operated member is a pulley provided rotatably to the bracket, the inner cable is wound around the pulley with more than one turn, and at the same time, the end of the inner cable is engaged with the pulley.

Effect of the Invention

The control cable of this invention comprises the outer casing is provided slidably to the reinforcing wire, therefore the flexibility of the outer casing is much higher compared with the case in which the reinforcing wire is embedded integrally. Further, the control cable of this invention comprises the outer casing provided to be slidable to the reinforcing wire and not to constrain the thermal deformation in the axial direction based on the variation of ambient temperature, the outer casing relatively expands or contracts to the reinforcing wire, when the outer casing thermally expands under the use environment of high temperature, or thermally contracts under the use environment of low temperature. However, the expansion/contraction of the outer casing does not affect the amount of operation of the inner cable. The substantial length of the control cable is restricted by the reinforcing wire. And, the control cable of this invention comprises the reinforcing wire of a metal wire, therefore the thermal expansion coefficient is not so different to the inner cable. Hence, the total length of the portion further extending from the both ends of the reinforcing wire of the inner cable stays unchanged against that in the time of attaching, and is kept to be almost constant. Hence, malfunction is hard to occur.

Moreover, when the inner cable is pull-operated, the outer casing cannot receive the reactive force of the tensile force applied to the inner cable, but the configuration of the cabling of the outer casing (the curvature radius of the curved portion etc.) is kept by the flexural rigidity of the reinforcing wire and the outer casing. Accordingly, it is not a problem that the outer casing does not receive the compressing force in the axial direction. Stated differently, the reactive force of the tensile force of the inner cable is generally supported by the compressive force resistance of the outer casing in the axial direction. However in the control cable of this invention, the inner cable is supported by the reinforcing wire through the outer casing. And, since the reinforcing wire is surrounded by the outer casing, buckling is prevented. Thereby, the transmitting function of operating force at the same level as the conventional control cable can be served.

In the above described control cable in which the reinforcing wire is provided as one pair in parallel and the inner cable is arranged between those reinforcing wires, the compressive force resistance is improved, since the compression force which the reinforcing wire receives is dispersed into two wires. Moreover, in the case that it is formed as a ribbon-like shape, the flexibility in the time when it is bent in the direction perpendicular to a plane which the two reinforcing wires form is distinctly high.

In the case that the inner cable is provided as one pair in parallel and reinforcing wire is arranged between those inner cables, it is usable for operating two operated members with one operating member. Further, it is usable for the type of control cable in which, when the one inner cable is pull-operated, the other inner cable is return operated. In this case, the reinforcing wire is sufficient only to support the tensile force of the one inner cable, the transmitting function of operating force does not become so low. And, since the one reinforcing wire is sufficient, the composition is easy and the cabling is easy. Further, since the one outer casing is sufficient, the cabling becomes easy. And, in the case that the outer casing is composed so as to be a ribbon-like shape, the flexibility in the time when it is bent in the direction perpendicular to the plane which the two inner cables form is very high.

In the case that the reinforcing wire is composed of a metal single wire, and the inner cable is composed of twisted wires of a plurality of metal element wires, the action of receiving the compression force in the axial direction by the reinforcing wire is secure, and the transmitting action of the tensile force by the inner cable improves. Moreover, the flexibility of the whole of the control cable improves and enhances the easy cabling. In the case that the reinforcing wire and the inner cable is composed of metal single wire, the composition is simple and the manufacturing is easy.

Since the remote control apparatus of the present invention uses the above described control cable, it bring out all the advantageous effects. Further, since at least one end of the outer casing is held by the bracket of the operating side or the operated side slidably in the axial direction, the angle of the outer casing to the bracket is restricted. Hence, the elastic reactive force when the outer casing is bent, can be received by the bracket. Further, the shape maintainability of the cabling and the guiding ability for the inner cable are high.

In the case that the above described operating member and the operated member are pulleys provided rotatably within a predetermined range to the each bracket, in the case that the outer casing exhibits a ribbon-like shape; the reinforcing wire is provided along the center of the outer casing, and at the same time, the inner cables is provided as one pair of two wires, and in the case that the inner cable is provided slidably along the both side edge the outer casing, the composition of the remote control device becomes simple and the weight and the operating force becomes light.

In the case that at least one end side of the end of the one pair of the inner cable are fixed firmly by one cable end mutually in a lump, and the cable end is engaged with the pulley of the operating side or the pulley of the operated side, the assembling work becomes easy.

In the case that the operating member or the operated member is a pulley provided rotatably to the bracket, in the case that the inner cable is wound around the pulley with more than one turn, and at the same time, the end of the inner cable is engaged with the pulley, the slack of the inner cable is few and the drop out from the pulley is hard to occur.

Hereinafter, the preferred embodiments of the control cable and the remote control device of the present invention will be described with reference to the drawings.

BRIEF DESCRIPTION OF DRAWINGS

FIG. 1 is a perspective view showing an embodiment of the control cable of the invention.

FIG. 2a is a cross section of the control cable of FIG. 1, FIG. 2b is a cross section showing the other embodiment of the control cable of the invention.

FIG. 5a and FIG. 5b are respectively a plain view and a side view of the control cable used for the remote control device of FIG. 4a.

BEST MODE FOR CARRYING OUT THE INVENTION

Figure 3:
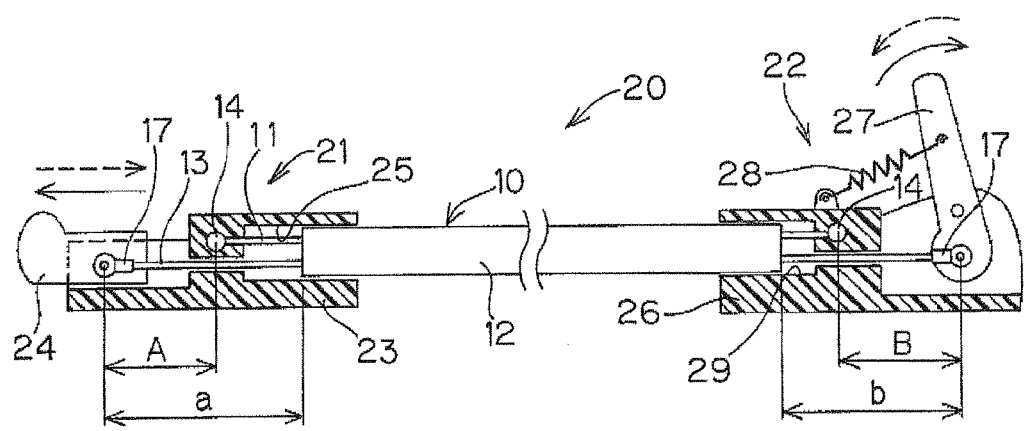
FIG. 3 is a rough side view showing the embodiment of the remote control device of the invention.

A control cable 10 shown in FIG. 1 is composed of a reinforcing wire 11, an outer casing 12 slidably provided around the reinforcing wire 11, and an inner cable 13 slidably housed in the outer casing 12. The both ends of the reinforcing wire 11 protrude from the outer casing 12, and the both ends of the inner cable 13 are further extended in the axial direction from the both ends of the reinforcing wire 11.

The reinforcing wire 11 is composed of metal single wire such as stainless steel wire, or a hard steel wire of oil temper wire, spring steel wire, piano wire and etc. However, it may be that in which a plurality of metal wires are twisted. The outer diameter of the reinforcing wire 11 is different according to the outer diameter of the inner cable 13, and it is normally about 0.5 to 3 mm, preferably about 0.5 to 1 mm. The both ends of the reinforcing wire 11 are the portion fixed to brackets etc. And the anchors 14 same as those of cable ends are firmly fixed to the both ends by clamping or casting (foundry). Without providing the anchor 14, the ends may be fixed to the bracket and etc. by bending or folding the end (see FIG. 5b, FIG. 7a), or by letting through or winding around a hole formed in the bracket.

The outer casing 12 has about circular shape in its cross section as shown in FIG. 2. The outer casing 12 is provided with a reinforcing cable insertion hole 15 and an inner cable insertion hole 16 leaving a space in between near the center. The interval between the insertion holes 15, 16 is about 1 to 5 mm, the outer diameter of the outer casing 12 is about 3 to 7 mm. The inner diameter of the reinforcing wire insertion hole 15 is made to be the dimension capable of inserting the reinforcing cable slidably relatively, and the inner diameter of the inner cable insertion hole 16 is made to be the dimension capable of reciprocatingly sliding the inner cable 13 with ease.

For the outer casing 12, an extrusion mold made of thermoplastic resin is suitably used. As the thermoplastic resin such as polyetheretherketone, polyethersulfone, polycarbonate, polyethylene terephthalate, polybuthylene terephthalate, polyarylate, polyphenylene sulphide, polyimide, polyamide, polyamideimide, polysulfone, polyacetal, polyphenylene oxide, polyethylene, polypropylene are preferable, which are hard, and high in thermostability and shape holdability. But it may be fluorocarbon resin etc.

As the inner cable 13, the inner cable of conventional control cables can be used, for example, a single wire of steel element wire of the outer diameter 0.1 to 0.6 mm, or 7 to 133 single wires are twisted is used. But, the inner cable of push-pull control cables can be used. To the both ends of the inner cable 13, publicly known cable ends 17 are firmly fixed by clamping or casting respectively. In this embodiment, cable ends 17 provided with a stopping hole 17a similar to a pressure terminal used for electric wiring is adopted. But, those which are of other configurations such as cylindrical, spherical can be used.

The length of the reinforcing wire 11 may vary according to the method of fixing of the end, but normally, it is made to be about 20 to 100 mm longer than the length of the outer casing 12. Thereby, when the outer casing 12 thermally expands under a high temperature environment or thermally contracts under a low temperature environment, it does not affect the operation of the inner cable 13. The length of the inner cable 13 is different according to the operating stroke, but it is preferable to be longer than the reinforcing cable 11 about "length of the stroke+5 to 100" mm.

In the embodiment of FIG. 2, the cross-sectional shape of the outer casing 12 is about circular. But, the outer casing 18 having ribbon-like shape as a whole may be used. The outer casing 18 has a dumbbell-like cross section and it comprises a reinforcing wire pipe 18a to let through the reinforcing wire, a cable pipe 18b to let through an inner cable 18, and a flat joining portion 18c which joins them. In the reinforcing wire pipe 18a, the reinforcing wire insertion hole 15 is formed, and in the cable pipe 18b, the inner cable insertion hole 16 is formed. This outer casing 18 is very high in its flexibility when it is bent in the plane perpendicular to the joining portion 18c passing the axial direction (when it is bent in the left and right direction of the paper). Moreover, the amount of synthetic resin used is also few. The interval between the reinforcing pipe 18a and the cable pipe 18b is made to be about equal to the interval between the reinforcing wire insertion hole 15 and the inner cable insertion hole 16 of the outer casing 12 of FIG. 2a.

The control cable 10 described above can be used, for example, for a remote control device 20 shown in FIG. 3. This remote control device 20 is composed of an operating mechanism 21, an operated mechanism 22, and the control cable 10 which couples the both. The operating mechanism 21 is equipped with a bracket 23 and a knob 24 slidably provided to the bracket 23. In the bracket 23, an outer receptacle 25 which slidably holds the outer casing 12 of the control cable 10 in the axial direction is provided.

The operated mechanism 22 is equipped with a bracket 26, a lever 27 turnably provided to the bracket 26, and a return spring 28 which energizes the lever in the drawback direction on a steady basis. In the bracket 26, an outer receptacle 29 similar to that above described is provided.

The one end of the inner cable 13 of the control cable 10 is coupled to the knob 24 of the operating mechanism 21 through the cable end 17, and the other end is coupled to the lever 27 of the operated mechanism 22. The anchors 14, 14 of the both ends of the reinforcing wire 11 are fixed respectively to the operating side bracket 23 and the operated side bracket 26. The both ends of the outer casing 12 are respectively coupled to be held slidably by the outer receptacles 25, 29 of the operating side and the operated side brackets 23, 26. Thereby, the flexion of the inner cable 13 and the reinforcing wire 11 is prevented. Though not shown in the figure, the whole of the control cable 10 is bent along the way. The minimum curvature radius of the bent portion is, for example, about 30 to 200 mm. Since the more the curvature radius becomes small, the more the sliding resistance of the inner cable 13 becomes large, the curvature radius is made large as far as possible according to the cabling environment.

Since in the control cable 10 as described above, the reinforcing wire 11 is inserted into the outer casing 12, therefore suitable flexibility and the shape-holding capability can be obtained. Thereby, it does not become loose even if it is laid in the space of engine room of automobiles. However, it can also be fixed to the surrounding piping or wiring. In this case, it is clasped by strings or clamps, for example at 2 to 3 places, so that the bent status does not change while allowing the movement in the axis direction.

When the control cable 10 of FIG. 3 thermally expands or thermally contracts by ambient temperature, due to the difference of the thermal expansion coefficient of the outer casing 12 made of synthetic resin and the inner cable 13 made of metal, the sum "a+b" of the portion a, b protruding from the outer casing 12 of the inner cable 13 changes from the dimension of normal temperature. But, since the control cable 10 is made to be the structure to allow the expansion and contraction of the outer casing 12, the substantial length of control cable is restricted by the reinforcing wire 11 made of metal. And, since the thermal expansion coefficient of the inner cable and the reinforcing wire 11 is about identical, the sum "A+B" of the portion A, B extending from the reinforcing wire 11 of the inner cable 13 does not change by temperature. Therefore the problem to wrongly operate the inner cable 13 due dot the thermal expansion and thermal contraction will not rise. These effects are similar if it is cabled as FIG. 4.

As the operating member in the remote control device of the invention, other than the above described knob and the lever, traditionally used various operating member such as pulleys, cable drums can be used. For example, in the remote control device 30 of FIG. 4a, FIG. 4b, as the operating member, a pulley 31 is adopted, in which two inner cables 13a, 13b are wound inversely and engaged. In this, by the reciprocatingly turning operation of the pulley 31, two inner cables 13a, 13b can be alternately pull-operated.

Figure 4A:
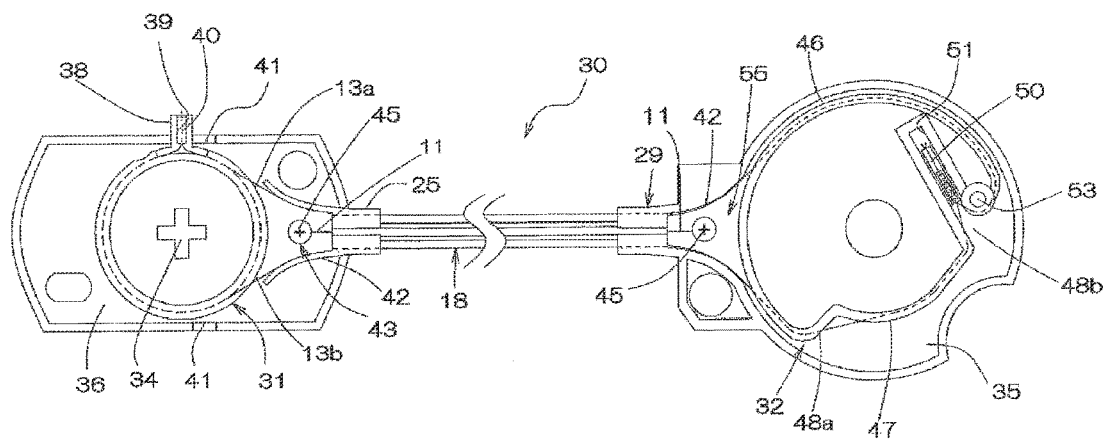
FIG. 4a and FIG. 4b are respectively a plain view and a side view showing the other embodiment of the remote control device of the invention.
Figure 4B:
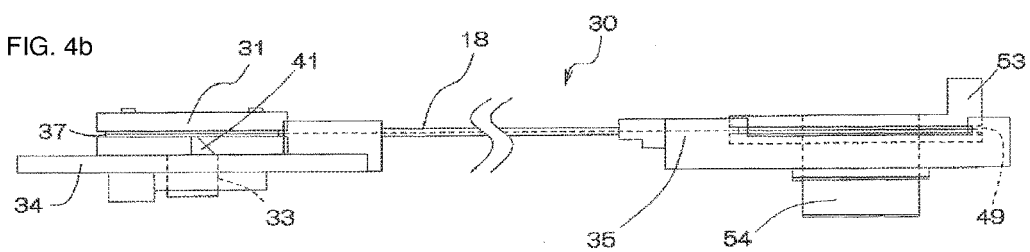

Moreover, for the operated member, other than the lever and the knob, the various configuration of the operated member such as a pulley 32 and cable drum in which two inner cables wound in inversely and engaged may be used like shown in FIG. 4a, FIG. 4b. In the device of FIG. 4a, two inner cable 13a, 13b are operated alternately and the pulley 32 of the operated member are driven reciprocatingly in turns.

The remote control device 30 shown in FIG. 4a and FIG. 4b is applied to a remote control device to operate a conduit control flap which switches the ambient air intake and the air blasting from a heater of automobiles. This remote control device 30 is about same as the remote control device 80 of FIG. 10 later described, but the pulley 31 of operating side is smaller than the pulley 32 of the operated side. The pulley 31 of operating side is about circular, and the thin-walled cylinder-like support shaft 33 protruding downward is turnably supported by a bracket 34. The pulley 32 of operated side is also turnably supported by a bracket 35.

Figure 5A:
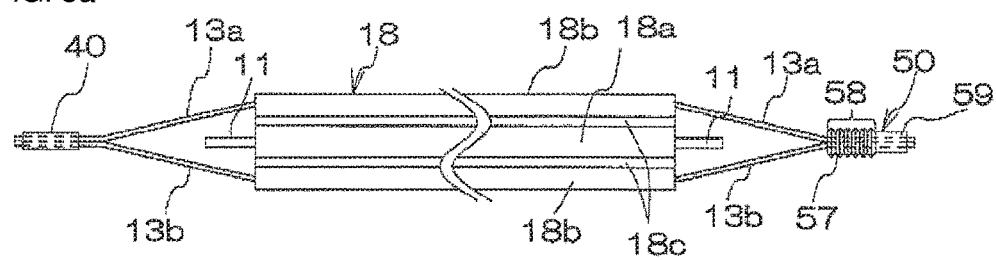

In the central portion of the pulley 31 of operation side, a cross-shaped through hole 36 for letting through a drive shaft 36 is formed. Further in the periphery of the pulley 31, a guide groove (37 of FIG. 4b) in which the inner cables 13a, 13b engage are formed. Moreover, an engaging protrusion 38 protrudes outward radially from the periphery of the pulley 31. A cable end 40 is engaged to the engaging groove 39 formed in the engaging protrusion 38. This cable end 40 is square bar-like. The ends of the two inner cables 13a, 13b are clamped in a lump directing toward an identical direction, as shown in FIG. 5a. Hence, the attachment of the inner cables 13a, 13b to the pulley 31 is easy.

In addition, any of the inner cables 13a, 13b may be wound around the pulley 31 with more than one turn. In this case, the inner cables 13a, 13b are hard to become loose, and are hard to drop off from the guide groove. Further, the operation stroke can be made longer than the peripheral length of the pulley 31. In the case that only one inner cable is wound with more than one turn, the length of the left and right inner cables becomes different, but it does not cause any problem particularly. About the pulley 32 of the operated side, the inner cables 13a, 13b can be wound with more than one turn, which serves the similar effects.

The bracket 34 of operating side is of about rectangular shape, the left and right end portion is made to be circular arc adapted to the contour of the bracket 35 of operated side. Thereby, the operating mechanism and the operated mechanism can be placed in pile saving the space when shipping or storing them. In the straight line side of the bracket 34 of operating side, a stopper 41 to restrict the turning angle of the pulley 31 engaging with the engaging protrusion 38 of the pulley 31 is protruded. The stopper 41 is provided as one pair, left and right. Further, in the circular arc shape side edge of the bracket 34, an outer receptacle 25 to slidably support the one end of the outer casing 18 is provided. The outer receptacle 25 is equipped with guide piece 42 of about circular arc shape to guide the inner cables 13a, 13b smoothly in the direction of tangential line of the pulley 31.

Figure 5B:
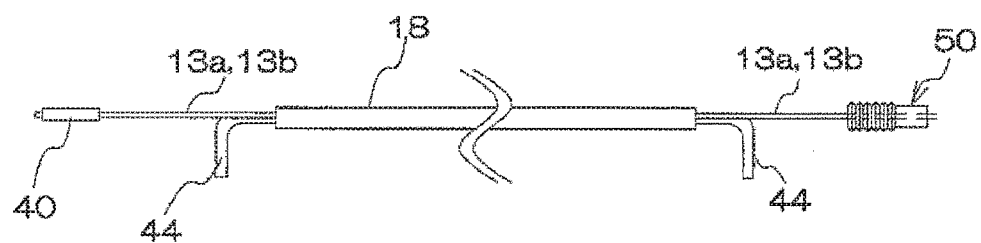

Further in the bracket 34, a fixing portion 43 to fix the one end of the reinforcing wire 11 is provided at a position in between the guide piece 42. In this embodiment, as shown in FIG. 5b, the end portion of the reinforcing wire 11 is folded, and the folded portion 44 is inserted into a hole formed in the fixing portion 43. Further, a tapping screw 45 is screwed into the portion adjacent to the hole, and the end portion of the reinforcing wire 11 is fastened so that the folded portion 44 does not drop out.

As shown in FIG. 4*a*, the peripheral portion of the pulley 32 of operated side is not of circular shape concentric with the rotational center. The peripheral portion of the pulley 32 is equipped with a large diameter portion 46, a small diameter portion 47, and inclined portions 48*a*, 48*b* which connect them. In the large diameter portion 46 and the small diameter portion 47, a guide groove 49 to guide the inner cables 13*a*, 13*b* is provided. Since the radius of the large diameter portion 46 of the pulley 32 of operated side is larger than the radius of the pulley 31 of operated side, its turning angle is smaller than the operating angle of the pulley 31 of operating side. Accordingly, the large diameter portion 46 around which the inner cables 13*a*, 13*b* are wound or unwound is made to be a partial circular arc, not to be circumferential.

Further, in the inclined portion 48*b* of one side of the pulley 32 of operated side, an engaging groove 51 to engage a cable end 50 is formed. Adjacent to the engaging groove 51 an operating object is provided. In this embodiment a bearing portion 53 to couple the flap of a heater conduit is provided so as to protrude. Moreover, in the lower portion of the pulley 32, a thin-walled cylinder-like support shaft 54 is protruded, and the support shaft 54 is turnably supported by the bracket 35.

The bracket 35 which turnably support the pulley 32 of operated side is about circular, and a part of it has a circular-arc notch. The bracket 35 of the pulley 32 has the outer receptacle 29 similar to the bracket 34 of operating side, and a fixing portion 55 of the reinforcing wire 11. This outer receptacle 29 also is equipped with the guide piece 42 to guide the two inner cables 13*a*, 13*b* smoothly in the direction of tangential line of the large diameter portion 46. A fixing portion 55 is provided between the guide pieces 42.

Between the operating side and the operated side, a ribbon-like shaped outer casing 18 like shown in FIG. 5*a*, FIG. 5*b* is laid, and two inner cables 13*a*, 13*b* and one reinforcing wire 11 are slidably housed in the outer casing 18. The outer casing 18 is provided with one reinforcing pipe 18*a* along the center line, is provided with one pair of cable pipes 18*b* along the both edge sides, and is provided with a thin-walled joining portion 18*c* in between the cable pipe 18*b*.

The both ends of the outer casing 18 are held respectively in the outer receptacle 25, 29 of the bracket of operating side and the operated side slidably or at least with the strength not to restrict the movement in the axial direction. The ends of the inner cables 13*a*, 13*b* protruding from the cable pipe 18*b* of the outer casing 18 are bundled together respectively by the cable ends 40, 50. The cable end 50 of operated side is composed of a column portion 58 in which an annular groove 57 of V shaped cross section is formed and a rectangular column portion 59 of the front edge side. The annular groove 57 is provided to eliminate any slack in the inner cable 13*a*, 13*b*.

In the remote control device 30 as described above, when the pulley 31 of operating side is reciprocatingly turned within a range restricted by the stopper 41, the pulley 32 of operated side can be turn-operated. In this case, since the diameter of the pulley 32 of operated side is large, the operated angle becomes smaller than the operating angle.

Figure 6A:
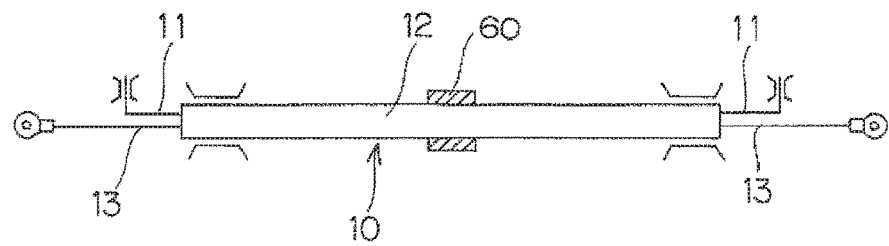
FIG. 6a, FIG. 6b, and FIG. 6c are respectively rough side views showing the other embodiment of the remote control device of the invention.
Figure 6B:
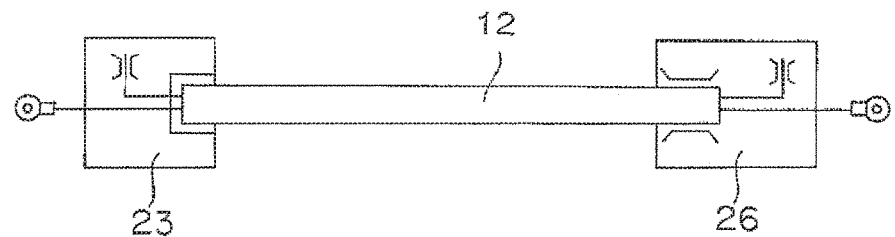

In the remote control device 20, 30 of FIG. 3 and FIG. 4*a*, the both ends of the outer casings 12, 18 are housed slidably to the bracket 23, 26, 34, 35. However, only one side or the one place in the midway of the outer casings 12, 18 can be fixed so as not to move in the axial direction. For example, as shown in FIG. 6*a*, the midway of the outer casing 12 may be fixed by an attachment member 60. Moreover, as shown in FIG. 6*b*, it is also possible that the one end is fixed to the one bracket among the bracket 23, 26 of both sides, and the other end is held slidably by the other bracket. In these cases, the outer casing 12 extends/contracts toward the both or one free end from the fixed position.

Figure 6C:
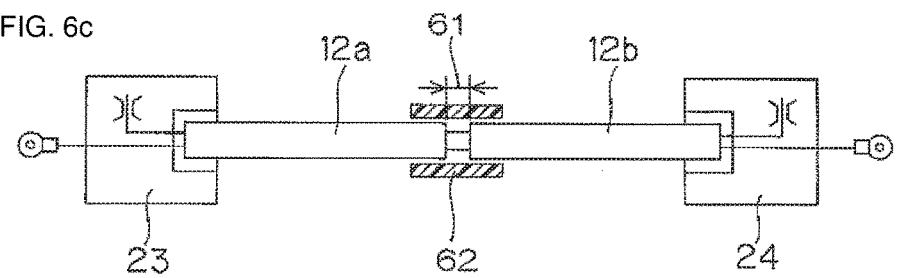

Moreover, as shown in FIG. 6*c*, the two outer casings 12*a*, 12*b* are arranged so as to be continuously provided with a clearance 61, the each end of the outer casing 12*a*, 12*b* can be fixed to the brackets 23, 26. In the vicinity of the clearance 61, it is preferable that to provide an outer holding member 62 to slidably and mutually hold the ends of the outer casings 12*a*, 12*b*, therefore the flexion of the inner cable 12 and the reinforcing wire 11 is prevented. This can absorb the thermal expansion of the outer casing 12 by the clearance 61. And, the outer holding member 62 can be fixed to a vehicle body etc.

Figure 7A:
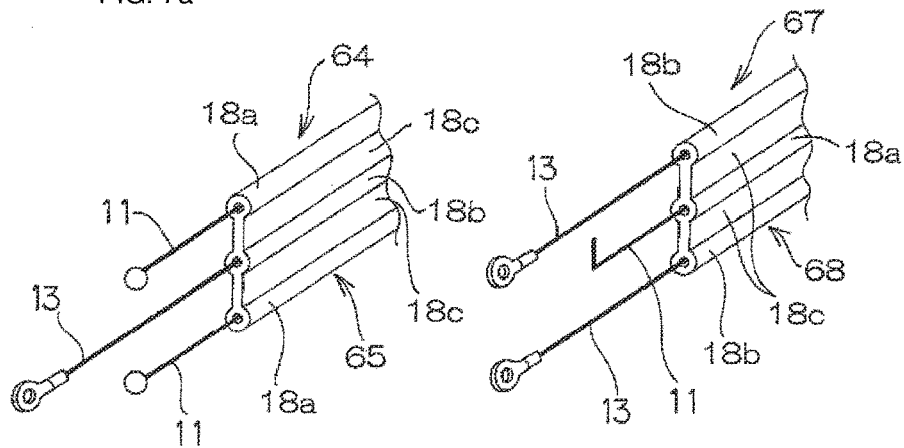
FIG. 7a and FIG. 7b are respectively substantial perspective views showing further the other embodiment of the control cable of the invention.

An outer casing 65 used for a control cable 64 of FIG. 7*a* is about similar to the ribbon-like shaped outer casing 18 of FIG. 2*b*, in which two reinforcing pipes 18*a*, 18*a* are arranged in parallel, a cable pipe 18*b* is arranged in between them, and the reinforcing pipe 18*a* and cable pipe 18*b* are joined by a flat joining portions 18*c*, 18*c*. Since this control cable 64 uses two reinforcing wires 11, the holding ability of the cabling configuration is improved. Moreover, since it is ribbon-like shaped, the flexibility is not so impaired.

Figure 7B:
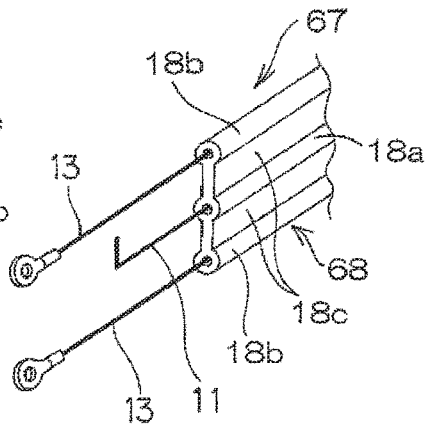

In an outer casing 68 used for a control cable 67 shown in FIG. 7*b*, contrary to the control cable 64 of FIG. 7*a*, two cable pipes 18*b*, 18*b* are arranged in parallel at an interval, the one reinforcing pipe 18*a* is arranged between them, and cable pipes 18*b* and reinforcing pipe 18 a are joined by a flat joining portions 18*c*, 18*c*. This control cable 67 can be used for the remote control device 30 of FIG. 4*a*, FIG. 4*b*. Further, it can be used for other remote control device, such as a device which can operate the operated member (lever etc.) 72, 72 of two places simultaneously through two inner cables 13, 13 by operating the operated member of the one knob 71 coupled to the operating mechanism like shown in FIG. 8.

Figure 8:
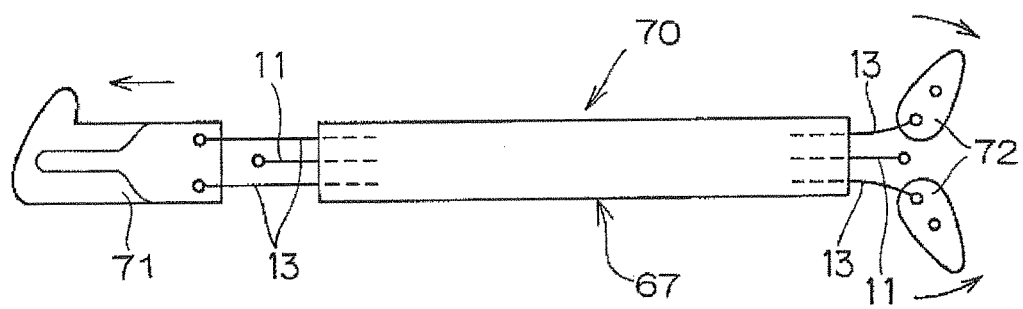
FIG. 8 is a side view showing further the other embodiment of the remote control device of the invention.
Figure 9:
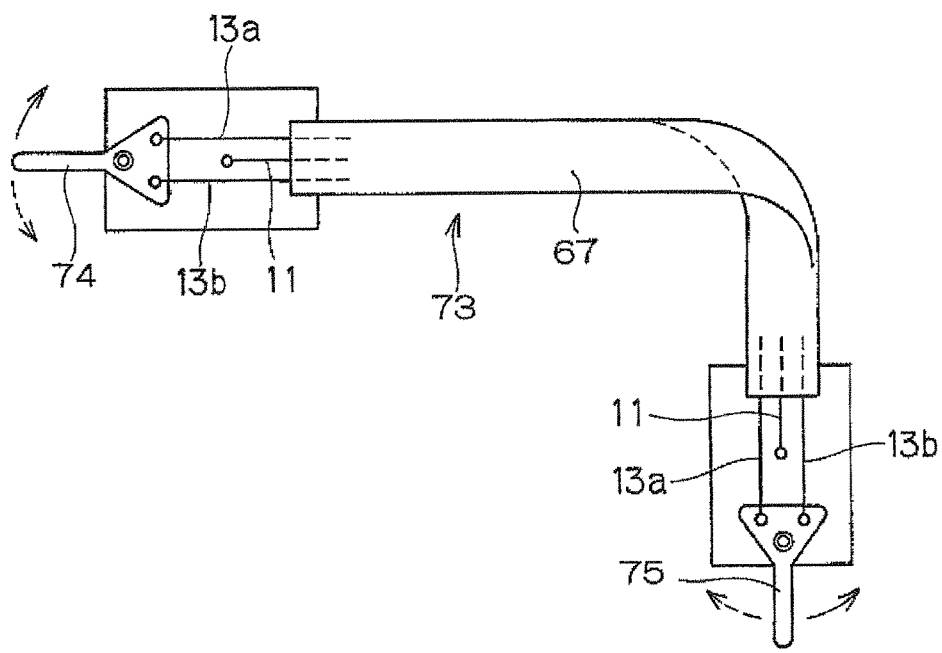
FIG. 9 is a side view showing further the other embodiment of the remote control device of the invention.

Moreover, as the remote control device 73 shown in FIG. 9, it may be constructed so to reciprocatingly swing the operated side lever 74, by coupling two inner cables 13*a*, 13*b* to the operating side lever 74, so as to be alternately pull-operated. In other words, when the operating side lever 74 is swung in one direction, the operated side lever 75 swings in one direction through the inner cable of one side. And, when it is swung to the other side, the operated lever 75 swings to the other side. In addition, the operating side lever 74 of FIG. 9 and the two operated members 72, 72 of FIG. 8 may be combined. In this case, by reciprocatingly operate the operating side lever 74 alternately, the two operated members 72, 72 are to be operated alternately.

Figure 10:
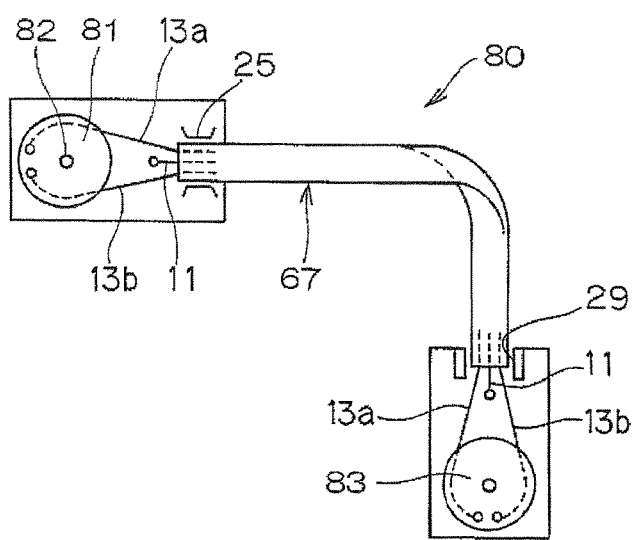
FIG. 10 is a side view showing further the other embodiment of the remote control device of the invention.
Figure 11:
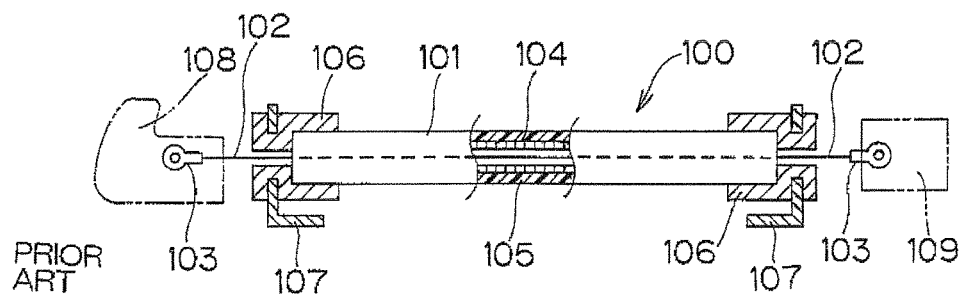
FIG. 11 is a partially notched side view showing an example of conventional control cables together with the installed status.
Figure 12:
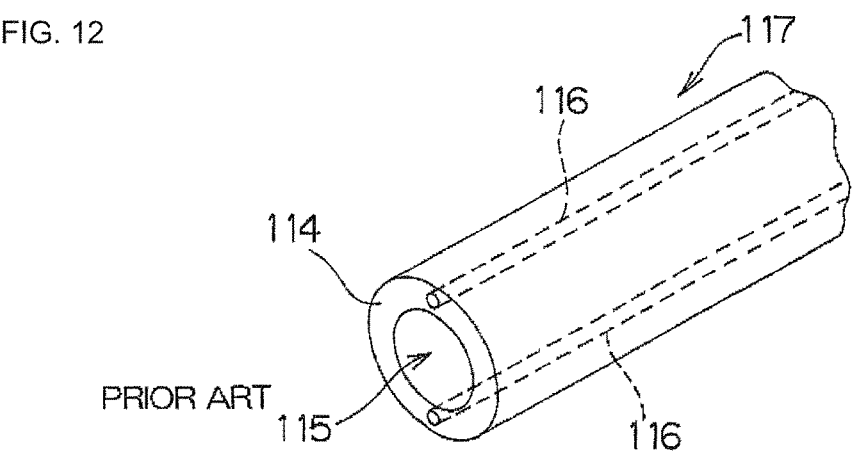
FIG. 12 is a substantial perspective view showing an example of the outer casing of conventional control cables.

In a remote control device 80 of FIG. 10, similar to the case of FIG. 4, a pulley 81 in which two inner cables 13*a*, 13*b* are wound inversely and engaged is adopted as the operating member. In addition, the each end of the inner cables 13*a*, 13*b* is separately engaged with the pulley 81. In this, the two inner cables 13*a*, 13*b* can be alternately pull-operated, by reciprocating operate the turning operation around the axis 82 of the pulley 81, Moreover, a pulley 83 in which the two inner cables 13*a*, 13*b* are inversely wound and separately engaged is adopted for the operated member. In this, the reciprocating turning operation of the pulley 83 being the operated member can be performed, by alternately operating the two inner cables 13a, 13b. Thus, in the remote control device 80 in which cables are laid using two pulleys 81, 83 in a closed loop configuration, the ends of the same sides of the two inner cables 13a, 13b can be mutually firmly fixed in a lump by one cable end same as the case of FIG. 4b. And it is also possible that the both ends of the one inner cable are bundled together by one cable end in a closed loop configuration, and at the same time, the other cable ends can be fixed firmly to the midway of the inner cable.

Any of the remote control device 30 of FIG. 4a, FIG. 4b, and the remote control device 70, 73, 80 of FIG. 8-10 adopt one control cable which can operate two inner cables. However, it is also possible to constitute a remote control device in which two control cables having one reinforcing wire 11 and one inner cable, as the control cable 10 of FIG. 1, respectively are laid in the similar closed loop configuration. When these control cables are used, the cabling is possible even if the operated side members 72 are apart mutually, and the operation is possible with the operating member at one place.

Moreover, in this embodiment, the pulley of operating side and the pulley of operated side are reciprocatingly turned within a predetermined angle range. But any of the devices can be constituted so as to be turn-operated more than one turn. In this case, the either pulleys of operating side and the operated side are made to be circular, and the inner cable will be wound around the pulley more than one turn. The guide groove (see reference numeral 49 of FIG. 4a) to guide the inner cable is formed to be spiral with more than one turn. But, it can be wound with more than one turn around one annular guide groove.

The remote control device of the present invention can be used for the remote control of heater conduits as described above, and is used in other uses, for example, a remote control device for a light load such as opening/closing the slide of lid of the console box of automobiles.

DESCRIPTION OF THE NUMERALS 10 control cable
11 reinforcing wire
12 outer casing
13 inner cable
14 anchors
15 reinforcing cable insertion hole
16 inner cable insertion hole
17 cable end
18 outer casing
18a reinforcing wire pipe
18b cable pipe
18c flat joining portion
20 remote control device
21 operating mechanism
22 operated mechanism
23 bracket
24 knob
25 outer receptacle
26 bracket
27 lever
28 return spring
29 outer receptacle
30 remote control device
31 pulley (operation side)
32 pulley (operated side)
33 support shaft
34 bracket (operation side)
35 bracket (operated side)
36 through hole
37 guide groove
38 engaging protrusion
39 engaging groove
40 cable end
41 stopper
42 guide peace
43 fixing portion
44 folded portion
45 tapping screw
46 large diameter portion
47 small diameter portion
48a, 48b inclined portions
49 guide groove
50 cable end (operated side)
51 engaging groove
52 support shaft
53 bearing portion
54 support shaft
55 fixing portion
57 annular groove
58 circular column portion
59 rectangular column portion
60 attachment member
61 clearance
62 outer holding member
64 control cable
65 outer casing
67 control cable
68 outer casing
70 remote control device
71 knob
72 operated member
73 remote control device
74 operating side lever
75 operated side lever
80 remote control device
81 pulley
82 shaft
83 pulley

The invention claimed is:

1. A remote control device, comprising:
an operating member which gives an operating force;
a first bracket connected on an operation side of the operating member and comprising a first outer receptacle;
a control cable operated by the operating member;
an operated member to receive the operation of the operating member through the control cable; and
a second bracket connected on an operated side of the operating member and comprising a second outer receptacle;
wherein the control cable, comprises:
a reinforcing wire made of metal, having a first end fixed to the first bracket and a second end fixed to the second bracket;
an outer casing made of synthetic resin, having a first end slidably held by the first outer receptacle and a second end slidably held by the second outer receptacle in an axial direction and configured so as to be slidable with respect to the reinforcing wire, and so as not to constrain the thermal deformation in the axial direction based on the variation of ambient temperature; and
an inner cable made of metal having flexibility and slidably housed in the outer casing, the inner cable having a first end coupled to the operating member and a second end coupled to the operated member to transmit the operating force from the operating member to the operated member.

2. A remote control device according to claim 1, wherein the inner cable is provided as one pair in parallel, and the reinforcing wire is arranged between these inner cables.

3. A remote control device according to claim 1, wherein the outer casing comprises a cable pipe to receive the inner cable;
a reinforcing pipe to receive the reinforcing wire; and
a flat joining portion connecting the cable pipe and the reinforcing pipe to one another.

4. A remote control device according to claim 1, wherein the reinforcing wire is composed of a single wire made of metal, and the inner cable composed of a plurality of twisted wires of metal element wires.

5. A remote control device according to claim 1, wherein the reinforcing wire and the inner cable respectively are composed of a single wire made of metal.

6. A remote control device according to claim 1, wherein the operating member and the operated member are pulleys provided turnably within a predetermined angle to the each bracket,
the outer casing
comprises a cable pipe to receive the inner cable;
a reinforcing pipe to receive the reinforcing wire; and
a flat joining portion connecting the cable pipe and the reinforcing pipe to one another,
the reinforcing wire is provided slidably along the center of the outer casing, at the same time, the inner cable is provided as one pair, and
these inner cables are provided slidably along the both side edges of the outer casing.

7. A remote control device according to claim 6, wherein at least one end side of the ends of the one pair of the inner cable are firmly fixed by one cable end mutually in a lump, and the cable end is engaged with the pulley of the operating side or the pulley of the operated side.

8. A remote control device according to claim 1, wherein the operating member or the operated member is a pulley provided rotatably to the bracket,
the inner cable is wound around the pulley with more than one turn, and at the same time, the end of the inner cable is engaged with the pulley.

* * * * *